United States Patent Office 3,106,571
Patented Oct. 8, 1963

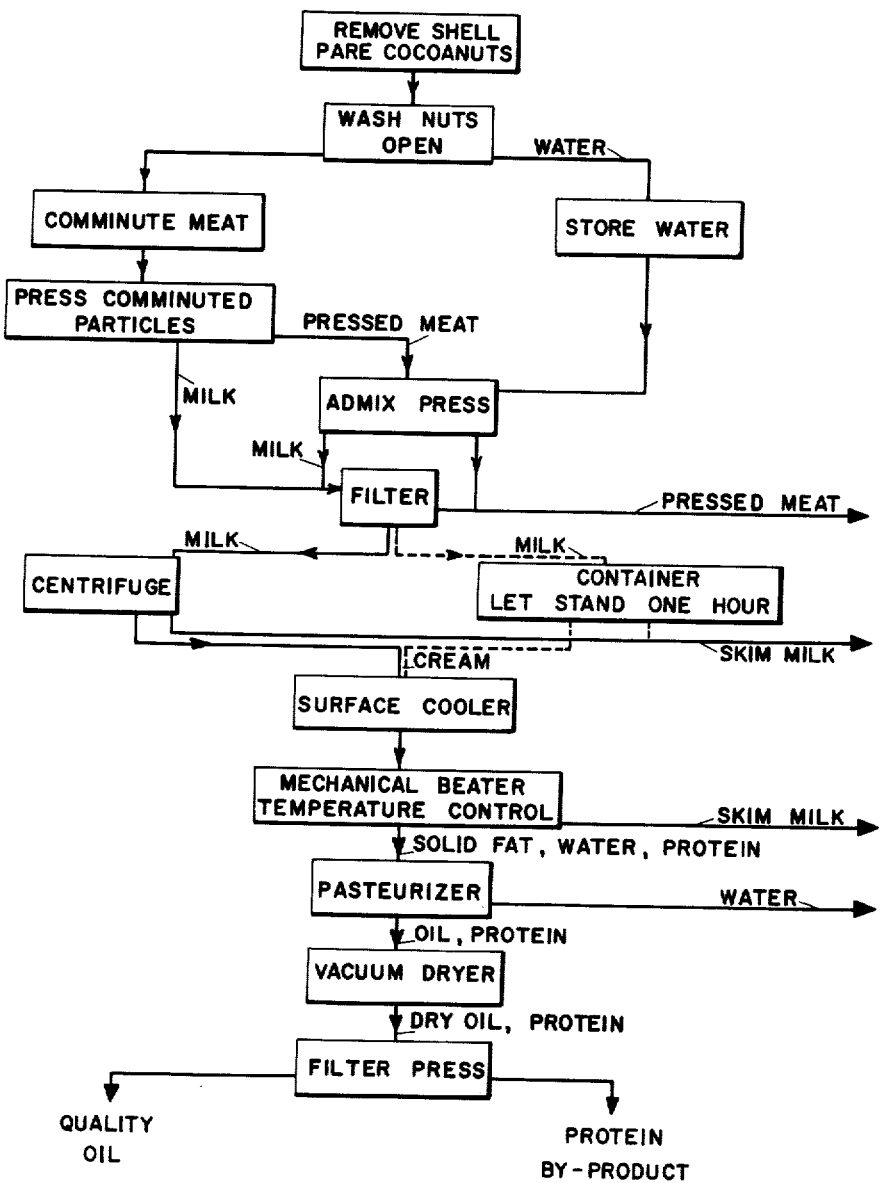

3,106,571
PHYSICO-MECHANICAL PROCESS OF OBTAINING HIGH QUALITY COCOANUT OIL
Dionisio Martinez Birosel, Quezon City, Republic of the Philippines, assignor, by direct and mesne assignments, of one-fourth each to Thomas C. Fisher, Washington, D.C., Leonardo C. Padilla, Manila, Republic of the Philippines, and Norwood G. Fisher, Wilmette, Ill.
Filed Oct. 14, 1955, Ser. No. 540,588
14 Claims. (Cl. 260—412.2)

The present invention relates to a method of processing cocoanuts to obtain high quality cocoanut oil and by-products capable of use for human consumption, and more particularly, to a physico-mechanical process for obtaining from the fresh cocoanuts high quality cocoanut oil while at the same time making available for further processing all the by-products obtained by the process in accordance with the present invention, which by-products are left pure by the present invention.

The present invention also relates to a high-quality cocoanut oil having excellent keeping qualities and to the by-products obtained in accordance with the present invention.

Previous methods of processing cocoanuts to produce the cocoanut oil relied upon the use of cultures of bacteria or chemical additives to produce the cocoanut oil. However, these prior art processes, aside from considerations of cost and quality control, rendered the by-products produced by such process unusuable for human consumption. At the same time, these prior art processes produced cocoanut oils having inferior and at times inadequate keeping qualities as well as unsuitable tastes and aromas.

Accordingly, it is an object of the present invention to provide a process which obviates the aforementioned disadvantages and shortcomings of the prior art processes.

Another object of the present invention is the provision of a process which enables the use of all the by-products of the process, and particularly of the fresh cocoanut meat, for purposes of processing into cheap food suitable for human consumption.

It is another object of the present invention to provide a process for obtaining high quality colorless cocoanut oil from the fresh cocoanuts in an economical and space-saving operation which is also simple and inexpensive.

Another object of the present invention is the provision of a process for obtaining cheap human food from fresh cocoanuts which permits uniform quality of the product and which enables effective control of the product thereof.

A still further object of the present invention is a process which produces a high percentage yield of high quality cocoanut oil and which entails a minimum of waste.

Another object of the present invention resides in the physico-mechanical process which relies exclusively on physical and mechanical steps and which avoids altogether the use of chemicals or micro-organisms and bacteria to derive oil from the fresh cocoanut meat.

Still another object resides in a process which is physico-mechanical throughout and which lends itself readily to mechanization and mass production.

Another object of the present invention resides in a method of processing the meat of fresh cocoanuts which prevents contamination of the by-product so as to render these by-products available for further processing into cheap foodstuffs suitable for human consumption without great costs or expenses.

A still further object of the present invention resides in the provision of a method to produce high quality oil from fresh cocoanut meats in which temperature control is used to inhibit the growth of any harmful bacteria thereby enabling the processing of the by-products in fresh condition and which method produces a high quality colorless cocoanut oil having a unique sweetish flavor and a mild aroma and which has excellent preservative or keeping qualities.

A still further object of the present invention resides in the provision of a process in which the edible oil of high quality and purity is produced at costs lower than those connected with commercial oils, which high quality oil needs no purification and which process obviates the need to convert the fresh cocoanuts first into copra.

A still further object of the present invention is the provision of an oil which contains the natural flavor of the water soluble portions of the whole cocoanut seeds.

Still a further object of the present invention resides in that uncontaminated by-products are obtained by the physico-mechanical process in accordance with the present invention which enables the use thereof for human consumption.

Further objects, features and advantages of the present invention will become more obvious from the following description when taken in connection with the accompanying drawing which shows, for purposes of illustration only, a schematic diagram of the various steps in accordance with the present invention.

The shells of the fresh cocoanuts are first removed in any suitable manner without breaking the kernels of the fruits.

After removal of the shell the meats are pared thereby separating the brown coating of the meat from the meat of the cocoanut itself whereby the thus separated brown coating or paring may be used to produce by means of pressing an oil resembling babassu oil which may be derived therefrom as a by-product.

Next the pared nuts are washed after which the pared and washed nuts are opened or punctured or treated in any suitable manner so as to remove the nuts the cocoanut water. The cocoanut water is preferably saved or stored in a container or suitable vessel for purposes of reuse later on in admixing the same to the pressed cocoanut meat prior to the second extraction of the cocoanut milk, as will be described more fully hereinafter.

The cocoanut meat from which the water had been removed is then comminuted in any suitable manner into small particles so as to break the oil cells thereof. The comminuted cocoanut meat is then subjected to the pressing action of either rollers, hydraulic presses or the like to squeeze out the cocoanut milk.

After the cocoanut milk is pressed from the comminuted cocoanut meat, the cocoanut water is admixed to the pressed meat and thereupon subjected to second pressing so as to increase the yield in cocoanut milk.

The cocoanut milk thus produced from the pressing may be filtered in any suitable manner, if so desired, so as to filter therefrom any remaining particles of the comminuted cocoanut meat.

The cocoanut milk thus produced which contains the cocoanut cream and the skim milk is treated to separate the cream of the cocoanut milk from the skim milk thereof which may be accomplished either by letting the filtered cocoanut milk stand for approximately one hour or by the use of an appropriate centrifuge.

The cream at that point is a rather stable cream emulsion of 50/50 oil in water with protein as a stabilizer.

The cream thus separated is subjected to a temperature control which may be effected in any suitable manner. However, one preferred way of cooling the cream thus obtained is to pass it over a surface cooler so as to solidify the minute oil droplets or particles at a temperature of 10 degrees centrigrade or a few degrees therebelow. The cooled cream which is still sufficiently fluid is then subjected to a mechanical beating while at the same time the temperature is controlled so as to rise to a point between 28° C. and 35° C. thereby enabling the solidified minute oil particles to coalesce and build into bigger and bigger particles of solid fats. During this step of continuous beating the cooled cream while simultaneously controlling the temperature thereof which is permitted to rise, the consistency of the cream changes until it becomes around 28° C. a mass of broken solids.

Upon further beating or stirring the water of the cocoanut skim separates out and is withdrawn.

The solid fats obtained after removal of the skim are subjected to further pressing or kneading action so as to eliminate more skim milk therefrom until the mass contains approximately 14 percent of water or less.

The temperature is controlled in the meantime to allow the solidified fat to attain a temperature of about 35° C. whereby oil forms on the top, a water layer appears at the bottom and protein remains between the oil and the water. The temperature control may be effected in any suitable manner, and for example may also be obtained by merely allowing the solidified fat which had previously been cooled to gradually attain room temperature in certain tropical-like climates.

It is also preferable to sterilize or pasteurize dewatered cream producing the oil to prevent it from being contaminated which may be done by controlling the temperature to rise from 35° C. to approximately 65° C., the latter being sufficient to provide sterilization of the cream.

In this condition, the oil is still on top, the water at the bottom and the protein oil layer therebetween.

After thus controlling the temperature and sterilizing the cream, the water is withdrawn from the bottom.

The two upper layers containing the oil and the protein may then be vacuum-dried by being placed into a vacuum pan at a temperature of 60° C.–70° C. to eliminate any existing water, if so desired, and then subjected to filter pressing producing the dry or dehydrated oil while the edible protein residues remain in the filter press. The step of filter pressing to separate the oil from the protein residues may also precede the step of drying in a vacuum pan so that only the oil is subjected to such vacuum drying action.

The dry oil may then be stored in any appropriate container while the edible protein which is pure and uncontaminated, may be used for purposes of producing edible foods suitable for human consumption, for example, for purposes of manufacture of candies.

Thus it is seen that the process in accordance with the present invention is purely physical and mechanical from beginning to end without the addition or admixture to the emulsion of any foreign substances, such as chemicals or bacteria. Furthermore, the exclusively physical and mechanical steps preclude any fermentation whatsoever because of the temperature control of the cocoanut cream during the process.

The process in accordance with the present invention which involves only physical and mechanical steps produces a colorless oil which requires no further purification and which possesses a sweetish taste and a mild, pleasant aroma and especially high keeping qualities. At the same time, the by-products derived by the process in accordance with the present invention are pure and free of any foreign substances so as to make them available for human consumption.

The temperature control in the physico-mechanical process according to the present invention is essential as it enables a decrease of the water content of the rather stable cream emulsion from 50 percent to 14 percent water content by mechanical means. At that point the emulsion is no longer a stable oil-water emulsion but rather a very unstable solid body in which upon warming to room temperature the oil separates on top.

Thus by the temperature control and mechanical beating or stirring the original stable cream emulsion of 50 percent water content is reduced to a state of unequilibrium enabling a ready means of recovery of the good quality oil present in the fresh cocoanut meat.

The simultaneous temperature control and mechanical beating, therefore, enables the recovery of the oil as well as certain by-products without the use of any additives to produce the high-grade colorless cocoanut oil.

Consequently, the continuous process of the present invention permits the separation of the oil from a stable emulsion of oil in water while simultaneously producing by-products which are fresh and pure and can be processed into cheap foods fit for human consumption.

The following are a few examples of the many possibilities for utilizing the oil and by-products made in accordance with the present invention.

The skim milk obtained by the process in accordance with the present invention, after admixture with synthetic fat simulating butter fat of mothers' milk to which oil soluble important features have been added, may be processed into a scientifically developed cocoanut milk for infants' feeding.

The coconut skim milk obtained by the present invention, after admixture with synthetic fats and sucrose inverted to about 50 percent and after adjustment of the component parts, may be processed into good, sweetened condensed milk. Similarly, the cocoanut skim milk obtained by the present invention, after admixture with proper amounts of synthetic fats and subsequent adjustments of its component parts, may be processed into good cocoanut milk powder. Furthermore, the cocoanut skim milk may also be processed into chocolate-coco milk.

The skim milk obtained by the present invention which can be made to yield precipitated albumen by boiling may also be processed into varied fermented cheese products after adjusting the component parts thereof and after adding proper fermenting organisms which produce the specific aroma of the cheese desired.

The cocoanut skim milk produced in accordance with the present invention may be made to yield upon boiling precipitated albumen whereby the watery portion thereof may be evaporated to produce a thick syrup for soft drinks.

The high quality cocoanut oil in accordance with the present invention having approximately 14 percent $H_2O$, after admixture with quality stearine or the like and incorporation of vitamins, may be processed into excellent cocoa butter having outstanding keeping qualities.

The cocoanut meal after pressing so as to contain only a predetermined amount of oil may be used for processing into cheap breakfast foods which may contain added sucrose, starchy flour, and salt to improve the taste and vitamins A and B complex.

When this cocoanut meal contains very little oil, it may be processed into feeds for livestock after admixture with other food articles as desired.

While I have described several embodiments, it is understood that the present invention is not limited thereto but is susceptible of many variations within the scope of a person skilled in the art, and I intend to cover all such modifications except as defined by the appended claims.

I claim:

1. A method for obtaining by exclusively physical and mechanical steps a high quality cocoanut oil from cocoanut cream extracted from cocoanuts comprising the step of beating the extracted cocoanut cream while simultaneously controlling the temperature thereof, wherein said temperature is caused to rise from a temperature of about 10° C. toward a temperature of about 35° C. until the consistency of the cream begins to change and becomes a mass of broken solids.

2. A method for obtaining high quality cocoanut oil from cocoanuts by exclusively physical and mechanical steps comprising the steps of extracting the cocoanut cream and thereupon beating the extracted cocoanut cream while simultaneously controlling the temperature thereof to rise from a temperature of 10° C. to 35° C.

3. A method for obtaining high quality cocoanut oil from cocoanuts by exclusively physical and mechanical steps comprising the steps of separating the cocoanut cream from the cocoanut milk, cooling the separated cream to approximately 10° C. and thereupon beating the cooled cocoanut cream while simultaneously controlling the temperature thereof to rise at least 18° C.

4. A method for obtaining high quality cocoanut oil and uncontaminated by-products from cocoanuts by exclusively physical and mechanical steps comprising the steps of extracting cocoanut milk from the fresh fruits, separating the cream from the skim milk, cooling the cream to a temperature of about 10° C., beating the cooled cocoanut cream while simultaneously causing the temperature thereof to rise so as to produce a dewatered cocoanut fat, and thereafter filter pressing the fat to separate the cocoanut oil from the protein residue of the fat.

5. A method for obtaining high quality cocoanut oil from cocoanuts by exclusively physical and mechanical steps comprising the steps of separating the cream from the cocoanut milk, cooling the separated cream to approximately 10° C., beating the cooled cocoanut cream while simultaneously controlling the temperature thereof to rise to at least 35° C., further beating to separate water from the treated cream and sterilizing the thus treated dewatered cream at a temperature of 65° C. and thereafter filter pressing the resultant cocoanut fat to separate the oil from the protein residues.

6. A method for obtaining high quality cocoanut oil and uncontaminated by-products by exclusively physical and mechanical steps comprising the steps of preparing the fresh fruit to derive therefrom the cocoanut milk, separating the cream from the cocoanut milk, lowering the cream to a temperature about 10° C. and then slowly increasing the temperature of the cream in a temperature range of about 10° C. to about 35° C. while simultaneously mechanically beating the same, and thereafter separating in a filter press the oil and protein residues obtained from said cream.

7. A method for obtaining high quality cocoanut oil and uncontaminated by-products by exclusively physical and mechanical steps comprising the steps of preparing the fresh fruit to derive therefrom the cocoanut milk, separating the cream from the cocoanut skim milk, cooling the cream to about 10° C., mechanically stirring the cooled cream while simultaneously causing the temperature to rise towards a temperature of about 35° C. so as to solidify the oil particles and produce solid fat particles, and thereafter separating the oil and protein residues in a filter press.

8. A method for obtaining high quality cocoanut oil from cocoanuts by exclusively physical and mechanical steps comprising the steps of separating the cream from the cocoanut milk, cooling the separated cream to approximately 10° C. thereupon producing solid cocoanut fat by beating the cooled cocoanut cream while simultaneously controlling the temperature thereof to gradually rise to a temperature between 28° C. and 35° C., pasteurizing the fat at 65° C. and thereupon filter pressing the pasteurized fat to separate the oil from protein residues and vacuum drying the oil.

9. A method for obtaining high quality cocoanut oil from cocoanuts by exclusively physical and mechanical steps comprising the steps of separating the cream from the cocoanut milk, cooling the separated cream to approximately 10° C. thereupon producing solid cocoanut fat by beating the cooled cocoanut cream while simultaneously controlling the temperature thereof to gradually rise to a temperature between 28° C. and 35° C., pasteurizing the fat at 65° C., thereupon vacuum drying and filter pressing the fat to further remove water therefrom and separate protein residues from the oil.

10. A method for obtaining high quality cocoanut oil from cocoanuts by exclusively physical and mechanical steps comprising the steps of producing from fresh cocoanut meat a stable emulsion of cream in water, the cream emulsion being cooled to about 10° C., and then beating the cocoanut cream emulsion while simultaneously controlling the temperature thereof as it rises in a temperature range of about 10° C. to about 35° C. to convert the stable emulsion into an unstable emulsion to enable separation of the cocoanut fats from the water, and thereafter filter pressing the fats to separate the high-quality oil from the protein residues.

11. A method for obtaining high quality cocoanut oil from cocoanuts by exclusively physical and mechanical steps comprising the steps of producing from fresh cocoanut meat a stable emulsion of cream in water at a temperature of 10° C., and then beating the cocoanut cream emulsion while simultaneously controlling the temperature thereof to rise to at least 28° C. to convert the stable emulsion into an unstable emulsion to enable separation of the cocoanut fats from the water, and thereafter filter pressing the fats to separate the high-quality oil from the protein residues.

12. A method for obtaining high quality cocoanut oil and uncontaminated by-products by exclusively physical and mechanical steps comprising the steps of preparing the fresh fruits to derive therefrom the cocoanut milk, separating the cream from the cocoanut milk, cooling the cream to about 10° C. and thereafter controlling the temperature of the cream as it rises in a temperature range of about 10° C. to about 35° C. while simultaneously mechanically beating the same, and thereafter separating the oil and protein residues in a filter press.

13. A method for obtaining high quality cocoanut oil and uncontaminated by-products by exclusively physical and mechanical steps comprising the steps of paring and washing the fresh fruits to separate the water from the fruit and deriving therefrom the cocoanut milk, separating the cream from the cocoanut skim milk, cooling the cream to about 10° C. and thereafter controlling the temperature of the cream as it rises in a temperature range of about 10° C. to about 35° C. while simultaneously mechanically beating the same, and thereafter separating the oil and protein residues in a filter press.

14. A method for obtaining high quality cocoanut oil and uncontaminated by-products by exclusively physical and mechanical steps comprising the steps of preparing the fresh fruits to remove the water, comminuting the meat of the cocoanuts into small particles, pressing the comminuted cocoanut meat to derive therefrom cocoanut milk, admixing the cocoanut water to the pressed cocoanut meat and subject the same to a second pressing to increase the yield of cocoanut milk, separating the skim milk from the cream, cooling the cream to a temperature of about 10° C., beating the thus cooled cream while controlling the temperature to rise to at least 28° C. to produce solid fatty particles, further beating the solid fatty particles while continuing to control the temperature, causing said cream to separate into three layers of oil, protein residues and water, respectively, separating the water from the bottom of said layers, and filter pressing the two top layers containing the oil and protein residues obtained in the mechanical beater to separate the oil from the protein residues.

References Cited in the file of this patent

UNITED STATES PATENTS

| | | |
|---|---|---|
| 1,366,339 | Alexander | Jan. 25, 1921 |
| 1,374,879 | Cookson et al. | Apr. 12, 1921 |
| 2,101,371 | Lava | Dec. 7, 1937 |

FOREIGN PATENTS

| | | |
|---|---|---|
| 10,601 of 1914 | Great Britain | July 1, 1915 |
| 117,819 | Great Britain | Jan. 23, 1919 |

OTHER REFERENCES

Associates of Rogers, Fundamentals of Dairy Science (2nd edition), A.C.S. Monograph Series No. 41, pp. 196–199 (1935), Reinhold Publishing Corp., New York, N.Y.

UNITED STATES PATENT OFFICE
CERTIFICATE OF CORRECTION

Patent No. 3,106,571                      October 8, 1963

Dionisio Martinez Birosel

It is hereby certified that error appears in the above numbered patent requiring correction and that the said Letters Patent should read as corrected below.

In the grant, lines 5 and 16, and in the heading to the printed specification, line 8, for "Norwood G. Fisher", each occurrence, read -- G. Norwood Fisher --.

Signed and sealed this 14th day of April 1964.

(SEAL)
Attest:
ERNEST W. SWIDER

EDWARD J. BRENNER

Attesting Officer

Commissioner of Patents